US009813923B2

(12) United States Patent
Jiang et al.

(10) Patent No.: US 9,813,923 B2
(45) Date of Patent: Nov. 7, 2017

(54) DUPLEX MODE ADAPTIVE METHOD AND APPARATUS

(71) Applicant: Huawei Technologies Co., Ltd., Shenzhen, Guangdong (CN)

(72) Inventors: Hongli Jiang, Chengdu (CN); Huaping Qing, Chengdu (CN); Ping Cao, Chengdu (CN); Qiao Liu, Beijing (CN); Yu Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 15/054,562

(22) Filed: Feb. 26, 2016

(65) Prior Publication Data
US 2016/0183105 A1 Jun. 23, 2016

Related U.S. Application Data

(63) Continuation of application No. PCT/CN2013/082359, filed on Aug. 27, 2013.

(51) Int. Cl.
*H04L 15/16* (2006.01)
*H04W 24/02* (2009.01)
(Continued)

(52) U.S. Cl.
CPC .............. *H04W 24/02* (2013.01); *H04L 1/20* (2013.01); *H04L 5/143* (2013.01); *H04L 5/1469* (2013.01);
(Continued)

(58) Field of Classification Search
CPC .................................................... H04W 24/02
(Continued)

(56) References Cited

U.S. PATENT DOCUMENTS

2004/0252659 A1* 12/2004 Yun ...................... H04W 76/02
370/328
2008/0159203 A1* 7/2008 Choi .................... H04B 7/0689
370/328
(Continued)

FOREIGN PATENT DOCUMENTS

CN 1538640 A 10/2004
CN 102036430 A 4/2011
(Continued)

OTHER PUBLICATIONS

Taneli Riihonen et al., "Hybrid Full-Duplex/Half-Duplex Relaying with Transmit Power Adaptation", IEEE Transactions on Wireless Communications, vol. 10, No. 9, Sep. 2011, p. 3074-3085.

*Primary Examiner* — Shripal Khajuria

(57) ABSTRACT

The present invention relates to the field of network communications, and discloses a duplex mode adaptive method, including: querying the modulation mode configuration table, to obtain a maximum modulation mode of the current duplex mode and a maximum modulation mode of the non-current duplex mode; calculating maximum spectral efficiency of the current duplex mode according to the maximum modulation mode of the current duplex mode; calculating maximum spectral efficiency of the non-current duplex mode according to the maximum modulation mode of the non-current duplex mode; comparing the maximum spectral efficiency of the current duplex mode with the maximum spectral efficiency of the non-current duplex mode, and selecting a duplex mode whose spectral efficiency is greater as a next-step duplex mode; and switching a duplex mode of the wireless communications apparatus to the next-step duplex mode.

12 Claims, 4 Drawing Sheets

(51) Int. Cl.
*H04L 5/14* (2006.01)
*H04L 1/20* (2006.01)
*H04W 72/04* (2009.01)
*H04W 72/08* (2009.01)
*H04L 1/00* (2006.01)

(52) U.S. Cl.
CPC ..... *H04W 72/0473* (2013.01); *H04W 72/082* (2013.01); *H04W 72/085* (2013.01); *H04L 1/0003* (2013.01)

(58) Field of Classification Search
USPC .......................................................... 370/296
See application file for complete search history.

(56) References Cited

U.S. PATENT DOCUMENTS

2011/0075593 A1\* 3/2011 Chen ................... H04B 1/0057
370/280
2011/0292843 A1\* 12/2011 Gan ................... H04B 7/15557
370/277
2012/0063422 A1\* 3/2012 Wakabayashi ........ H04W 28/14
370/335

FOREIGN PATENT DOCUMENTS

| CN | 102301822 A | 12/2011 |
| CN | 102497222 A | 6/2012 |
| CN | 102595627 A | 7/2012 |
| CN | 102612156 A | 7/2012 |
| CN | 102948089 A | 2/2013 |

\* cited by examiner

DUPLEX MODE ADAPTIVE METHOD AND APPARATUS

CROSS-REFERENCE TO RELATED APPLICATIONS

This application is a continuation of International Application No. PCT/CN2013/082359, filed on Aug. 27, 2013, which is hereby incorporated by reference in its entirety.

TECHNICAL FIELD

The present invention relates to network communications technologies, and in particular, to a duplex mode adaptive method and apparatus.

BACKGROUND

As requirements for mobile communications services increase, requirements for network bandwidth increase exponentially. Microwave transmission is an important means of mobile backhaul and has an increasingly high requirement for bandwidth. Microwave spectrum resources are limited, and it becomes particularly important to improve utilization of a microwave spectrum. In an existing full duplex (FD, Full Duplex) technology, signals are transmitted and received simultaneously at one frequency over an air interface. As compared with two conventional duplex modes, that is, frequency division duplex (Frequency Division Duplex, FDD) and time division duplex (Time Division Duplex, TDD), full duplex improves spectrum utilization of a system.

When a full duplex technology is applied in microwave communication, two extreme cases exist: When weather conditions are good, the atmosphere causes little signal attenuation, wanted signals received by a system are much more than self-interference signals, and a capacity of the system can be further increased by means of full duplex communication. When weather conditions are bad, the atmosphere causes large signal attenuation, wanted signals received by a system are much less than self-interference signals, and if the system still performs communication in a full duplex mode in this case, quality of the communication is seriously affected, and a capacity of the system is reduced.

SUMMARY

Embodiments of the present invention provide a duplex mode adaptive method and apparatus, so as to solve a problem in the prior art that that quality of communication is seriously affected under a poor channel condition because a duplex mode cannot be changed in a process of microwave communication.

The following technical solutions are adopted in the embodiments of the present invention:

According to a first aspect, the present invention provides a duplex mode adaptive method, including:

obtaining a modulation mode configuration table, self-interference isolation, and information about a transmitted signal and information about a received signal of a wireless communications apparatus;

calculating signal quality of a current duplex mode according to the current duplex mode, the self-interference isolation, and the information about the transmitted signal and the information about the received signal; and predicting signal quality of a non-current duplex mode according to the non-current duplex mode, the self-interference isolation, and the information about the transmitted signal and the information about the received signal;

querying the modulation mode configuration table according to the signal quality of the current duplex mode and the signal quality of the non-current duplex mode, to obtain a maximum modulation mode of the current duplex mode and a maximum modulation mode of the non-current duplex mode;

calculating maximum spectral efficiency of the current duplex mode according to the maximum modulation mode of the current duplex mode, and calculating maximum spectral efficiency of the non-current duplex mode according to the maximum modulation mode of the non-current duplex mode;

comparing the maximum spectral efficiency of the current duplex mode with the maximum spectral efficiency of the non-current duplex mode, and selecting a duplex mode whose spectral efficiency is greater as a next-step duplex mode; and switching a duplex mode of the wireless communications apparatus to the next-step duplex mode.

In a first possible implementation manner, the current duplex mode is a full duplex mode or a non-full duplex mode.

With reference to the first aspect or the first possible implementation manner of the first aspect, in a second possible implementation manner, the switching a duplex mode of the wireless communications apparatus to the next-step duplex mode specifically includes:

if the current duplex mode is different from the next-step duplex mode, switching the duplex mode of the wireless communications apparatus to the next-step duplex mode; otherwise, keeping the current duplex mode unchanged.

With reference to the first aspect, or the first possible implementation manner or the second possible implementation manner of the first aspect, in a third possible implementation manner, the information about the transmitted signal and the information about the received signal includes transmit power of a signal and receive power of a signal.

With reference to the first aspect, or the first possible implementation manner, the second possible implementation manner, or the third possible implementation manner of the first aspect, in a fourth possible implementation manner, the signal quality includes a signal-to-noise ratio of an input wanted signal.

With reference to the first aspect, or the first possible implementation manner, the second possible implementation manner, or the third possible implementation manner of the first aspect, in a fifth possible implementation manner, the signal quality includes power and a signal-to-interference ratio of an input wanted signal.

According to a second aspect, the present invention provides a duplex mode adaptive apparatus, including:

an obtaining unit, configured to obtain a modulation mode configuration table, self-interference isolation, and information about a transmitted signal and information about a received signal of a wireless communications apparatus; and query the modulation mode configuration table according to signal quality of a current duplex mode and signal quality of a non-current duplex mode, to obtain a maximum modulation mode of the current duplex mode and a maximum modulation mode of the non-current duplex mode;

a calculating unit, configured to calculate the signal quality of the current duplex mode according to the current duplex mode, the self-interference isolation, and the information about the transmitted signal and the information about the received signal; predict the signal quality of the non-current duplex mode according to the non-current duplex mode, the self-interference isolation, and the information about the transmitted signal and the information about the received signal; and calculate maximum spectral efficiency of the current duplex mode according to the maximum modulation mode of the current duplex mode, and calculate maximum spectral efficiency of the non-current duplex mode according to the maximum modulation mode of the non-current duplex mode;

a selecting unit, configured to compare the maximum spectral efficiency of the current duplex mode with the maximum spectral efficiency of the non-current duplex mode, and select a duplex mode whose spectral efficiency is greater as a next-step duplex mode; and a switching unit, configured to switch a duplex mode of the wireless communications apparatus to the next-step duplex mode.

In a first possible implementation manner, the current duplex mode is a full duplex mode or a non-full duplex mode.

With reference to the second aspect or the first possible implementation manner of the second aspect, in a second possible implementation manner, the switching unit includes:

a determining subunit, configured to determine whether the current duplex mode is the same as the next-step duplex mode; and a switching subunit, configured to: if the current duplex mode is different from the next-step duplex mode, switch the duplex mode of the wireless communications apparatus to the next-step duplex mode; otherwise, keep the current duplex mode unchanged.

With reference to the second aspect, or the first possible implementation manner or the second possible implementation manner of the second aspect, in a third possible implementation manner, the information about the transmitted signal and the information about the received signal includes transmit power of a signal and receive power of a signal.

With reference to the second aspect, or the first possible implementation manner, the second possible implementation manner, or the third possible implementation manner of the second aspect, in a fourth possible implementation manner, the signal quality includes a signal-to-noise ratio of an input wanted signal.

With reference to the second aspect, or the first possible implementation manner, the second possible implementation manner, or the third possible implementation manner of the second aspect, in a fifth possible implementation manner, the signal quality includes power and a signal-to-interference ratio of an input wanted signal.

According to the duplex mode adaptive method and apparatus provided in the embodiments of the present invention, adaptive switching is implemented between a full duplex mode and a non-full duplex mode; when a channel condition is good, work takes place in a full duplex mode, thereby improving a capacity of a system; and when a channel condition is not good, work takes place in a non-full duplex mode, thereby ensuring reliable transmission of a service.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Embodiments of the present invention provide a duplex mode adaptive method and apparatus. To make the technical solutions of the present invention more comprehensible, the following describes the embodiments of the present invention in detail with reference to the accompanying drawings.

It should be clear that the described embodiments are merely some but not all of the embodiments of the present invention. All other embodiments obtained by a person of ordinary skill in the art based on the embodiments of the present invention without creative efforts shall fall within the protection scope of the present invention.

Figure 1:
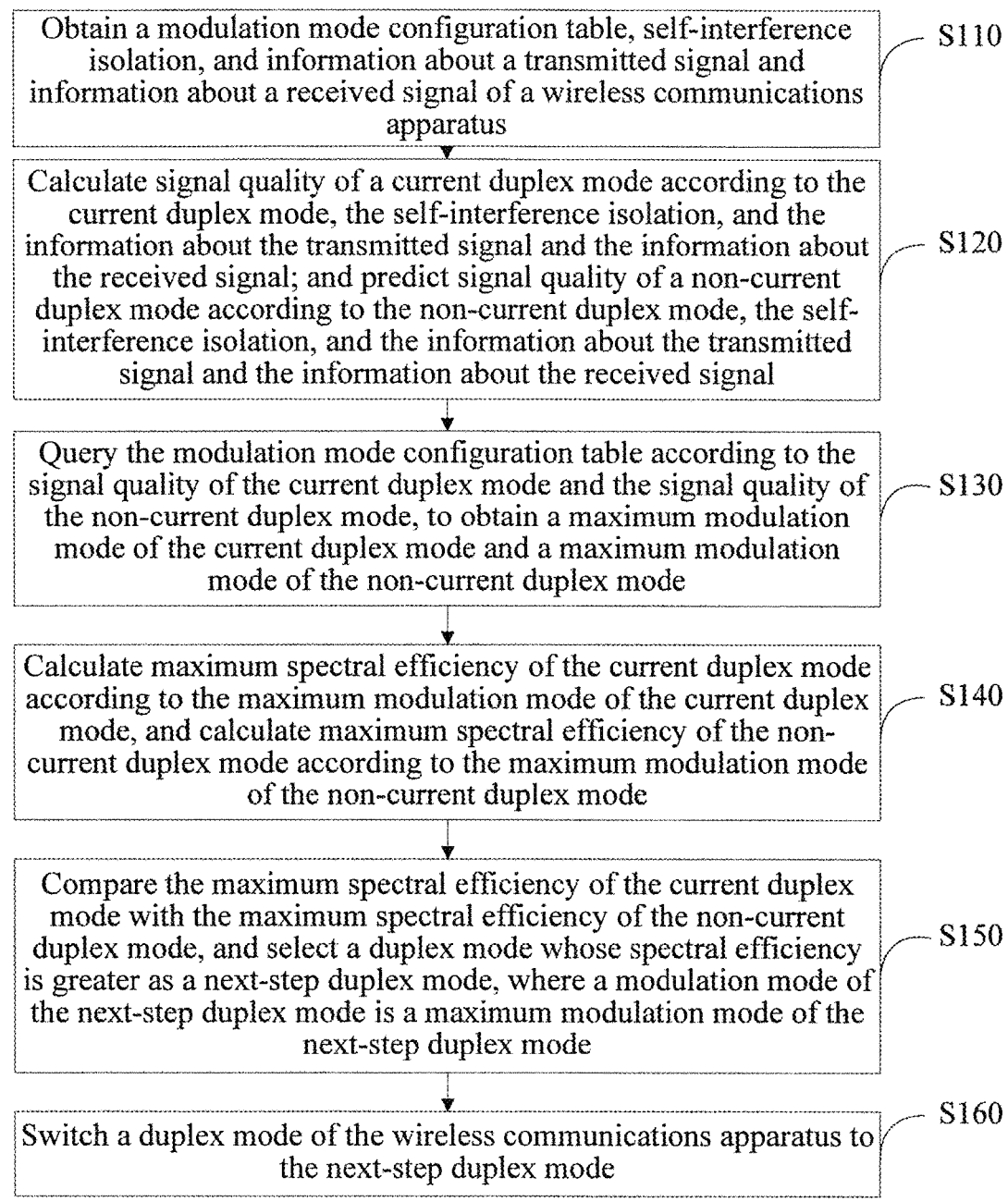
FIG. 1 is a flowchart of a duplex mode adaptive method according to an embodiment of the present invention.

An embodiment of the present invention provides a duplex mode adaptive method, and a process of the method is shown in FIG. 1. The method specifically includes the following steps:

Step S110: Obtain a modulation mode configuration table, self-interference isolation, and information about a transmitted signal and information about a received signal of a wireless communications apparatus.

In this embodiment, a correspondence between a modulation mode and signal quality of a duplex mode is recorded in the modulation mode configuration table, which may be obtained by means of pre-configuration. The signal quality may include a signal-to-noise ratio (Signal-to-Noise Ratio, SNR) of an input wanted signal, or the signal quality may include power and a signal-to-interference ratio (Signal-to-Interference Ratio, SIR) of an input wanted signal. As shown in Table 1, Table 1 is a modulation mode configuration table in which an example that signal quality of a duplex mode is a signal-to-noise ratio of an input wanted signal is used, and Table includes a correspondence between a modulation mode and a signal-to-noise ratio of an input wanted signal in a full duplex mode, and a correspondence between the modulation mode and a signal-to-noise ratio of an input wanted signal in a non-full duplex mode. The modulation mode configuration table may also include a correspondence between a modulation mode and the two: power and a signal-to-interference ratio of an input wanted signal in a full duplex mode, and a correspondence between the modulation mode and the two: power and a signal-to-interference ratio of an input wanted signal in a non-full duplex mode.

TABLE 1

Modulation mode configuration table

| Modulation mode | Signal-to-noise ratio (dB) of an input wanted signal in a full duplex mode | Signal-to-noise ratio (dB) of an input wanted signal in a non-full duplex mode |
|---|---|---|
| QPSK | 14 | 11 |
| 8 QAM | 18 | 14 |
| 16 QAM | 22 | 17 |
| 32 QAM | 26 | 21 |
| 64 QAM | 30 | 25 |
| 128 QAM | 33 | 28 |
| 256 QAM | 36 | 32 |
| 512 QAM | 39 | 35 |
| 1024 QAM | 42 | 38 |
| . . . | . . . | . . . |

The self-interference isolation is a ratio of receive power of a self-interference signal to transmit power of the self-interference signal, is determined by an antenna and/or an analog interference cancellation unit, and may be obtained by means of pre-measurement.

The information about the transmitted signal and the information about the received signal of the wireless communications apparatus may include transmit power of a signal and receive power of a signal. The information about the transmitted signal and the information about the received signal may further include information such as a mean square error.

Step S120: Calculate signal quality of a current duplex mode according to the current duplex mode, the self-interference isolation, and the information about the transmitted signal and the information about the received signal; and predict signal quality of a non-current duplex mode according to the non-current duplex mode, the self-interference isolation, and the information about the transmitted signal and the information about the received signal.

In this embodiment, the current duplex mode may be a full duplex mode or a non-full duplex mode. If the current duplex mode is a full duplex mode, the non-current duplex mode is a non-full duplex mode; or if the current duplex mode is a non-full duplex mode, the non-current duplex mode is a full duplex mode.

The non-full duplex mode may be a frequency division duplex (Frequency Division Duplex, FDD) or a time division duplex (Time Division Duplex, TDD) mode.

The signal quality may include a signal-to-noise ratio of an input wanted signal, or the signal quality may include power and a signal-to-interference ratio of an input wanted signal.

Step S130: Query the modulation mode configuration table according to the signal quality of the current duplex mode and the signal quality of the non-current duplex mode, to obtain a maximum modulation mode of the current duplex mode and a maximum modulation mode of the non-current duplex mode.

The modulation mode configuration table is queried according to the signal quality of the current duplex mode, to obtain a maximum modulation mode allowed by the signal quality of the current duplex mode; and the modulation mode configuration table is queried according to the signal quality of the non-current duplex mode, to obtain a maximum modulation mode allowed by the signal quality of the non-current duplex mode.

For example, the current duplex mode is a full duplex mode, a signal-to-noise ratio, which is obtained by means of calculation, of a wanted signal is 36 dB, and a predicted signal-to-noise ratio of a wanted signal in a non-full duplex mode is 38 dB. Table 1 is queried. A maximum modulation mode corresponding to the full duplex mode meeting the current signal-to-noise ratio is 256 QAM, and a maximum modulation mode corresponding to the non-full duplex mode meeting the predicted signal-to-noise ratio is 1024 QAM.

Step S140: Calculate maximum spectral efficiency of the current duplex mode according to the maximum modulation mode of the current duplex mode, and calculate maximum spectral efficiency of the non-current duplex mode according to the maximum modulation mode of the non-current duplex mode.

The spectral efficiency is a quantity of information bits that can be transmitted by using unit spectral bandwidth, and is related to a duplex mode, a modulation mode, and signal bandwidth. It is assumed that signal bandwidth of the full duplex mode and signal bandwidth of the non-full duplex mode are the same, and then under the same modulation mode and signal bandwidth, spectral efficiency of the full duplex mode is twice as high as that of the non-full duplex mode. For example, the current duplex mode is the full duplex mode, the maximum modulation mode is 256 QAM, and the spectral efficiency may be equivalent to $2*\log_2(256)=16$ bits. The non-current duplex mode is the non-full duplex mode, the maximum modulation mode is 1024 QAM, and the spectral efficiency may be equivalent to $\log_2(1024)=10$ bits.

Step S150: Compare the maximum spectral efficiency of the current duplex mode with the maximum spectral efficiency of the non-current duplex mode, and select a duplex mode whose spectral efficiency is greater as a next-step duplex mode, where a modulation mode of the next-step duplex mode is a maximum modulation mode of the next-step duplex mode.

For example, the current duplex mode is the full duplex mode, and the maximum spectral efficiency of the current duplex mode is 16 bits; the non-current duplex mode is the non-full duplex mode, and the maximum spectral efficiency of the non-current duplex mode is 10 bits; and then the next-step duplex mode is kept to be the full duplex mode.

Step S160: Switch a duplex mode of the wireless communications apparatus to the next-step duplex mode.

In this embodiment, if the current duplex mode is different from the next-step duplex mode, the duplex mode of the wireless communications apparatus is switched to the next-step duplex mode; otherwise, the current duplex mode is kept unchanged.

A control signal may be output to the wireless communications apparatus, and the duplex mode of the wireless communications apparatus is controlled by using the control signal, to switch the duplex mode of the wireless communications apparatus to the next-step duplex mode. Specifically, a service transmitting processing unit, a baseband signal transmitting processing unit, a service receiving processing unit, a baseband signal receiving processing unit, a digital interference cancellation unit, and an analog interference cancellation unit in a communications unit are controlled by using the control signal. If the current duplex mode is different from the next-step duplex mode, the control signal is used for indicating that the duplex mode of the wireless communications apparatus is to be switched to the next-step duplex mode; otherwise, indicating that the current duplex mode is to be kept unchanged.

In this embodiment, the self-interference isolation in step S110 may be obtained by means of pre-measurement by using the following method.

Figure 2:
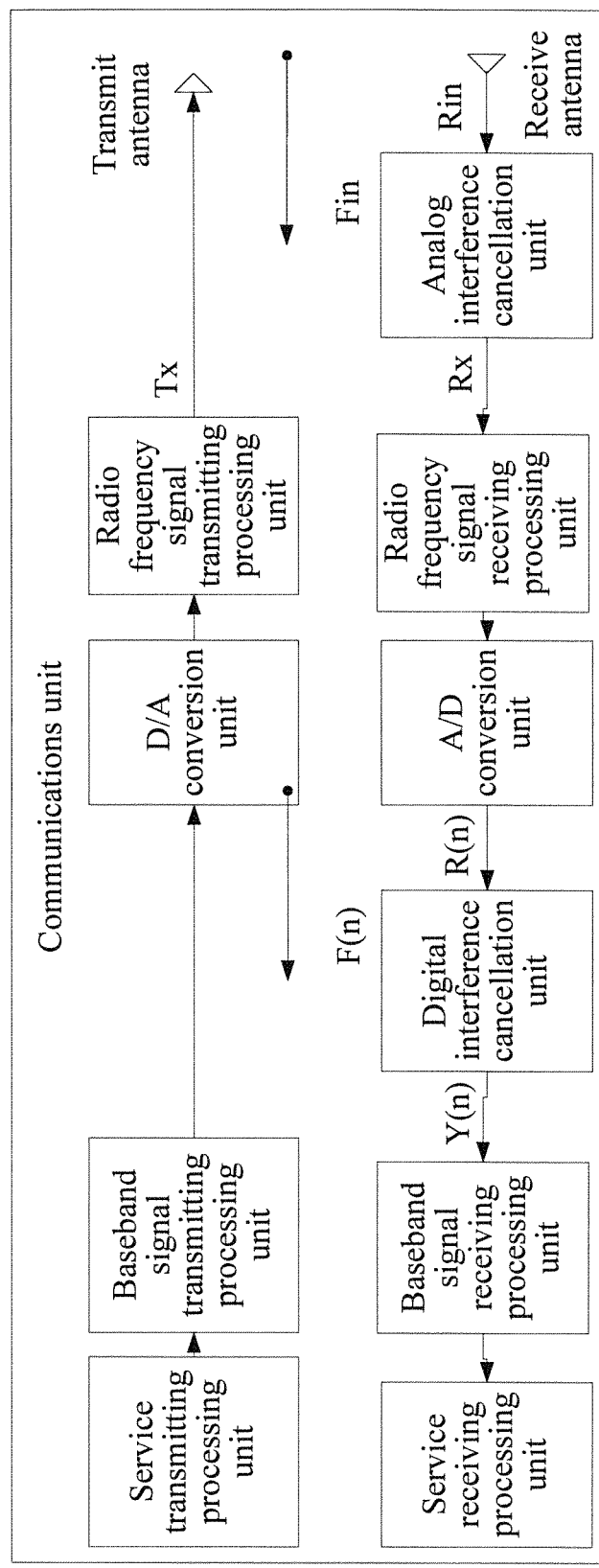
FIG. 2 is a structural block diagram of a communications unit in a wireless communications apparatus according to an embodiment of the present invention.

FIG. 2 is a structural block diagram of a communications unit in a wireless communications apparatus, where the wireless communications apparatus may be a microwave device. A service transmitting processing unit and a service receiving processing unit transmit and receive services simultaneously in a full duplex mode, transmit and receive services in a time division multiplexing manner in a time division duplex mode, and transmit and receive services in a frequency division multiplexing manner in a frequency division duplex mode. An analog interference cancellation unit and a digital interference cancellation unit perform interference cancellation in a full duplex mode, but do not perform interference cancellation in a non-full duplex mode. A baseband signal transmitting processing unit and a baseband signal receiving processing unit adjust modulation and demodulation modes under the control of a control signal.

Figure 3:
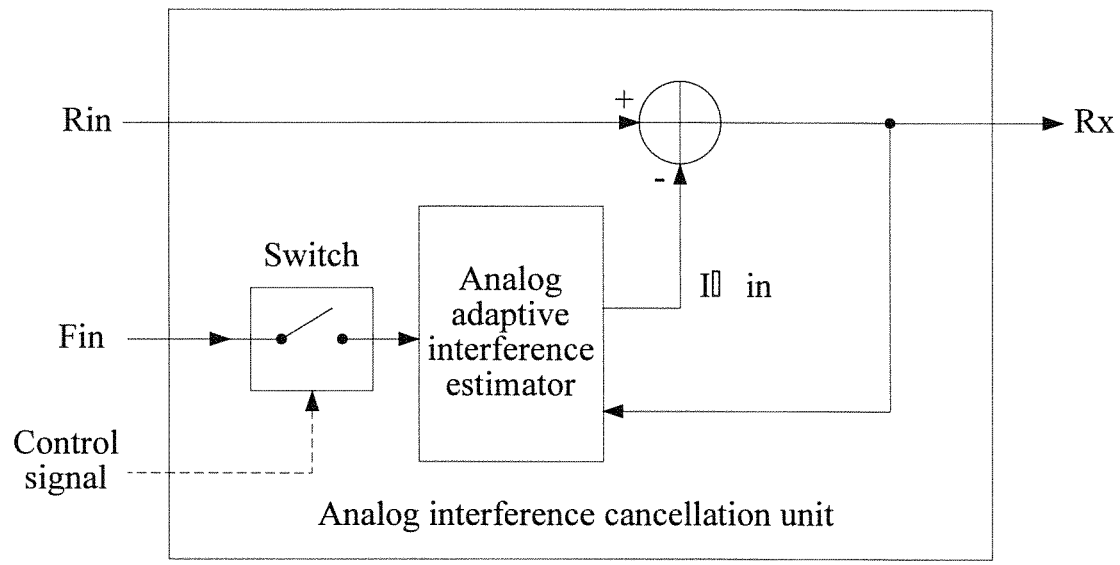
FIG. 3 is a structural block diagram of an analog interference cancellation unit in a communications unit according to an embodiment of the present invention.

FIG. 3 is a structural block diagram of an analog interference cancellation unit in a communications unit. $R_{in}$ is a received signal and comes from a receive antenna; $F_{in}$ is a self-interference reference signal and comes from a radio frequency signal transmitting processing unit of the communications unit; $R_x$ is an output signal after analog interference cancellation; and $I'_{in}$ is an estimated value, which is obtained by an analog adaptive interference estimator, of a self-interference signal $I_{in}$ in the received signal $R_{in}$. A switch is in a closed state in a full duplex mode and is in an open state in a non-full duplex mode. The analog adaptive interference estimator adaptively generates $I'_{in}$ according to $F_{in}$ and $R_x$.

In the full duplex mode, $R_{in}=U_{in}+I_{in}$, where $U_{in}$ is a received wanted signal in the received signal $R_{in}$. $I'_{in}$ adaptively changes with the output signal $R_x$, to minimize power of the output signal $R_x$. In an ideal case, the analog adaptive interference estimator can completely estimate the self-interference signal $I_{in}$ in the received signal $R_{in}$, to make an output signal after interference cancellation equal to the received wanted signal $U_{in}$. However, in an actual case, due to non-ideality of a component, deviates from $I_{in}$, and residual self-interference $I_x$ also exists in the output signal $R_x$.

In the non-full duplex mode, $R_{in}=U_{in}$, $I'_{in}$ generated by the analog adaptive interference estimator is zero, and $R_x=R_{in}$ is output. Herein, it is assumed that a component does not cause an insertion loss to the received signal $R_{in}$. If an insertion loss is considered, the power of the output signal $R_x$ is power of the received signal $R_{in}$ minus the insertion loss.

Self-interference isolation D is a ratio of power $P_i$ of the residual self-interference signal $I_x$ output by the analog interference cancellation unit to transmit power $P_t$ of a signal $T_x$, that is, $$D = \frac{P_i}{P_t}.$$

A transmitter of a peer wireless communications apparatus is turned off, a local wireless communications apparatus transmits a signal, and power of a signal that is output by an analog interference cancellation unit in the local wireless communications apparatus is tested, so as to obtain self-interference isolation.

Figure 4:
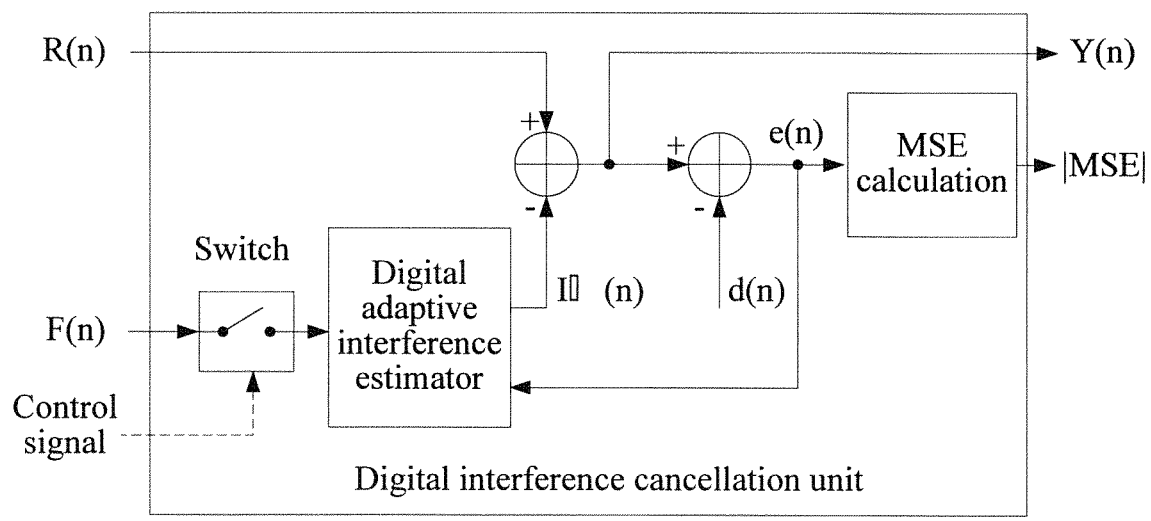
FIG. 4 is a structural block diagram of a digital interference cancellation unit in a communications unit according to an embodiment of the present invention.

In this embodiment, the signal quality of the current duplex mode in step S120 may be obtained by means of calculation by using the following method. An example that the signal quality is a signal-to-noise ratio of an input wanted signal is used, and a signal-to-noise ratio of an input wanted signal of the digital interference cancellation unit shown in FIG. 2 is the signal quality of the current duplex mode. FIG. 4 is a structural block diagram of a digital interference cancellation unit in a communications unit.

A signal-to-noise ratio of an input wanted signal of the digital interference cancellation unit may be obtained by means of calculation by using transmit power of a signal and receive power of a signal of a current wireless communications apparatus. A specific method includes:

If a current duplex mode is a full duplex mode, there is a self-interference signal in a signal received by an antenna, and an analog interference cancellation unit and the digital interference cancellation unit perform interference cancellation.

In the analog interference cancellation unit, power $P_i$ of a self-interference signal $I_x$ in an output signal $R_x$ of the analog interference cancellation unit is: $P_i=P_t*D$, where $P_t$ is transmit power of a signal $T_x$; receive power $P_u$ of a wanted signal $U_x$ is: $P_u=P_r-P_i$, where $P_r$ is power of the output signal $R_x$ of the analog interference cancellation unit; and a signal-to-interference ratio SIR is:

$$SIR = \frac{P_u}{P_i}.$$

Processing for a self-interference signal and processing for a wanted signal by a radio frequency signal receiving processing unit between the analog interference cancellation unit and the digital interference cancellation unit are the same, and an input signal-to-interference ratio SIR of the digital interference cancellation unit is equal to an output signal-to-interference ratio SIR of the analog interference cancellation unit. An analog circuit may introduce noise into an input signal, and higher power of the input signal indicates higher power of the noise. A signal-to-noise ratio $SNR_{total}$ of an input signal of the digital interference cancellation unit and power $P_r$ of an input signal $R_x$ of the radio frequency signal receiving processing unit (that is, the power $P_r$ of the output signal $R_x$ of the analog interference cancellation unit) meet a functional relation. Therefore, in the digital interference cancellation unit, the signal-to-noise ratio $SNR_{total}$ of the input signal is: $SNR_{total}=f(P_r)$. It may be obtained, according to the signal-to-noise ratio $SNR_{total}$ and a signal-to-interference ratio SIR of the input signal, that an SNR of an input wanted signal of the digital interference cancellation unit in the current duplex mode is:

$$SNR = \frac{SNR_{total}}{1 + (1/SIR)}.$$

If the current duplex mode is a non-full duplex mode, there is no self-interference signal in the signal received by the antenna, and the analog interference cancellation unit and the digital interference cancellation unit do not perform interference cancellation. The SNR of the input wanted signal in the current duplex mode is: $SNR=SNR_{total}=F(P_r)$.

In addition, the signal-to-noise ratio of the input wanted signal of the digital interference cancellation unit may also be obtained by adding an absolute value, that is, |MSE|, of a mean square error (Mean Square Error, MSE) of an output signal in the current duplex mode to a deterioration amount of a signal-to-noise ratio, and the deterioration amount of the SNR may be obtained in advance by means of a system test or emulation.

FIG. 4 is a structural block diagram of a digital interference cancellation unit. R(n) is a received signal and comes from an A/D conversion unit; F(n) is a self-interference reference signal and comes from a baseband signal transmitting processing unit; d(n) is an expected received signal and may be a training code; Y(n) is a self-interference estimation signal output by a digital adaptive interference estimator; Y(n) is an output signal after interference cancellation; e(n) is an error between the output signal and the expected received signal; and MSE is a mean square error, MSE=10*$\log_{10}$(|e(n)|$^2$), and |MSE| is equivalent to an output signal-to-noise ratio SNR. A switch is in a closed state in a full duplex mode and is in an open state in a non-full duplex mode. The digital adaptive interference estimator adaptively generates an estimated value I'(n) of a received self-interference signal according to a reference signal F(n) and an error signal e(n)

In the full duplex mode, the received signal R(n) is: R(n)=U(n)+I(n)+N(n). U(n) is a wanted signal, I(n) is a self-interference signal, and N(n) is a noise signal. I'(n) generated by a digital interference canceller adaptively changes with the error signal e(n), to minimize an output MSE.

In an ideal case, an adaptive interference estimator can completely estimate the self-interference signal in the received signal, that is, I'(n)=I(n), and then the output signal Y(n)=U(n)+N(n). However, due to non-ideality of the digital adaptive interference estimator, an estimated self-interference signal I'(n) deviates from the self-interference signal I(n) in the received signal, and a residual interference signal becomes noise in the output signal Y(n) In the non-full duplex mode, the received signal R(n)=U(n)+N(n), I'(n) generated by the digital interference canceller is zero, and the output signal Y(n)=R(n).

$SNR_{total}$ of the received signal R(n) in the full duplex mode is:

$$SNR_{total} = \frac{P_u + P_i}{P_n},$$

and an SNR of the wanted signal U(n) is:

$$SNR = \frac{P_u}{P_n},$$

where $P_u$ is power of the wanted signal U(n), $P_i$ is power of the self-interference signal I(n), and $P_n$ is power of the noise signal N(n). $SNR_{total}$ of the received signal R(n) in the non-full duplex mode is equal to the SNR of the wanted signal U(n), that is, $$SNR_{total} = SNR = \frac{P_u}{P_n}.$$

Due to the non-ideality of the digital adaptive interference estimator, the estimated self-interference signal I'(n) deviates from the self-interference signal I(n) in the received signal, and a residual interference signal I(n)−I'(n) becomes noise in the output signal Y(n), which makes am SNR of an output wanted signal deteriorates relative to an SNR of an input wanted signal. A deterioration amount of the SNR may be obtained in advance by means of a system test or emulation.

In this embodiment, the signal quality of the non-current duplex mode in step S120 may be obtained by means of prediction by using the following method. An example that the signal quality is a signal-to-noise ratio of an input wanted signal is used, and a signal-to-noise ratio of an input wanted signal of the digital interference cancellation unit shown in FIG. 2 is the signal quality of the non-current duplex mode.

A signal-to-noise ratio SNR' of an input wanted signal in the non-current duplex mode may be obtained by means of calculation by using transmit power of a signal and receive power of a signal of a wireless communications apparatus that are predicted. A specific method includes:

If a current duplex mode is a full duplex mode, a non-current duplex mode is anon-full duplex mode. If current local transmit power and peer transmit power are kept unchanged, after the full duplex mode is switched to the non-full duplex mode, there is no self-interference signal in a signal received by an antenna, and an analog interference cancellation unit and the digital interference cancellation unit do not perform interference cancellation. power P'$_r$ of an output signal of the analog interference cancellation unit is: P'$_r$=P$_r$−P$_t$*D. It may be obtained, according to P'$_r$, that the signal-to-noise ratio SNR' of the input wanted signal in the non-current duplex mode is: SNR'=SNR'$_{total}$=f (P'$_r$).

If the current duplex mode is a non-full duplex mode, the non-current duplex mode is a full duplex mode. If current local transmit power and peer transmit power are kept unchanged, after the non-full duplex mode is switched to the full duplex mode, there is a self-interference signal in the signal received by the antenna, and the analog interference cancellation unit and the digital interference cancellation unit perform an operation of interference cancellation. Power P'$_i$ of a self-interference signal output by the analog interference cancellation unit is: P'$_i$=P$_t$*D, power P'$_r$ of a signal output by the analog interference cancellation unit is: P'$_r$=P$_r$+P$_t$*D, and an output signal-to-interference ratio SIR' of the analog interference cancellation unit is:

$$SIR' = \frac{P_r}{P'_i}.$$

An input signal-to-interference ratio SIR' of the digital interference cancellation unit is equal to the output signal-to-interference ratio SIR' of the analog interference cancellation unit, and a signal-to-noise ratio of an input signal is SNR'$_{total}$=f(P'$_r$) Signal-to-noise ratio $$SNR' = \frac{SNR'_{total}}{1 + (1/SIR')}$$

of the input wanted signal in the non-current duplex mode may be obtained according to SIR' and SNR'$_{total}$.

In addition, the signal-to-noise ratio SNR' of the input wanted signal in the non-current duplex mode may also be obtained by the signal-to-noise ratio of the input wanted signal in the current duplex mode plus or minus a signal-to-noise ratio deviation between the two modes. If the current duplex mode is the full duplex mode, the signal-to-noise ratio of the input wanted signal in the non-current duplex mode is the signal-to-noise ratio of the current input wanted signal plus the signal-to-noise ratio deviation; or if the current duplex mode is the non-full duplex mode, the signal-to-noise ratio of the input wanted signal in the non-current duplex mode is the signal-to-noise ratio of the current input wanted signal minus the signal-to-noise ratio deviation.

For a radio frequency signal receiving processing unit, in a case in which power of an input wanted signal is the same, power of an input signal in the full duplex mode is greater than power of an input signal in the non-full duplex mode, and power of noise introduced by the full duplex mode is also greater than power of noise in the non-full duplex mode. Therefore, the signal-to-noise ratio of the input wanted signal of the digital interference cancellation unit in the full duplex mode is less than the signal-to-noise ratio of the input wanted signal in the non-full duplex mode. A deviation value of the signal-to-noise ratios of the input wanted signals of the two modes may be obtained by means of a system test.

According to the duplex mode adaptive method provided in this embodiment of the present invention, adaptive switching is implemented between a full duplex mode and a non-full duplex mode; when a channel condition is good, work takes place in a full duplex mode, thereby improving a capacity of a system; and when a channel condition is not good, work takes place in a non-full duplex mode, thereby ensuring reliable transmission of a service.

Figure 5:
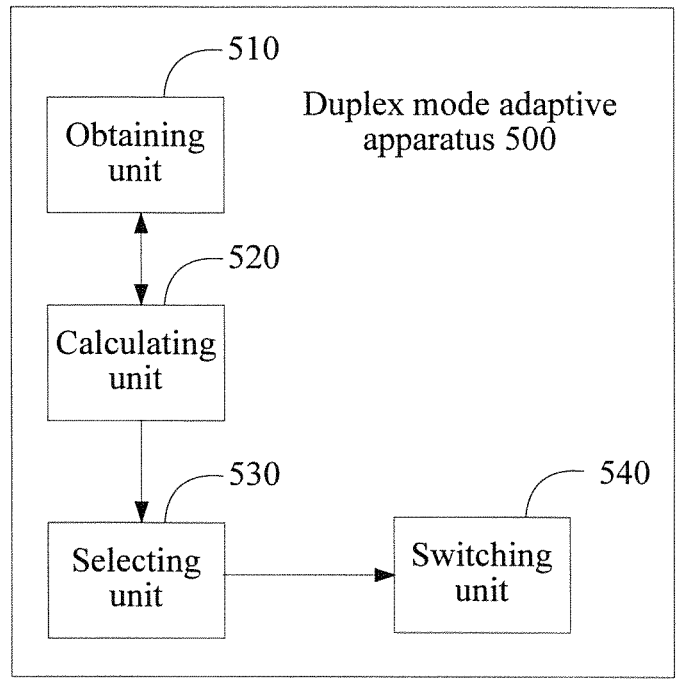
FIG. 5 is a structural block diagram of a duplex mode adaptive apparatus according to an embodiment of the present invention.

An embodiment of the present invention provides a duplex mode adaptive apparatus 500, where a structure of the duplex mode adaptive apparatus 500 is shown in FIG. 5, and the duplex mode adaptive apparatus 500 includes:

an obtaining unit 510, configured to obtain a modulation mode configuration table, self-interference isolation, and information about a transmitted signal and information about a received signal of a wireless communications apparatus; and query the modulation mode configuration table according to signal quality of a current duplex mode and signal quality of a non-current duplex mode, to obtain a maximum modulation mode of the current duplex mode and a maximum modulation mode of the non-current duplex mode;

a calculating unit 520, configured to calculate the signal quality of the current duplex mode according to the current duplex mode, the self-interference isolation, and the information about the transmitted signal and the information about the received signal; predict the signal quality of the non-current duplex mode according to the non-current duplex mode, the self-interference isolation, and the information about the transmitted signal and the information about the received signal; and calculate maximum spectral efficiency of the current duplex mode according to the maximum modulation mode of the current duplex mode, and calculate maximum spectral efficiency of the non-current duplex mode according to the maximum modulation mode of the non-current duplex mode;

a selecting unit 530, configured to compare the maximum spectral efficiency of the current duplex mode with the maximum spectral efficiency of the non-current duplex mode, and select a duplex mode whose spectral efficiency is greater as a next-step duplex mode; and a switching unit 540, configured to switch a duplex mode of the wireless communications apparatus to the next-step duplex mode.

Further, the current duplex mode may be a full duplex mode or a non-full duplex mode. The current duplex mode is the full duplex mode, and the non-current duplex mode is the non-full duplex mode; or the current duplex mode is the non-full duplex mode, and the non-current duplex mode is the full duplex mode.

Further, the switching unit 540 may include:

a determining subunit 541, configured to determine whether the current duplex mode is the same as the next-step duplex mode; and a switching subunit 542, configured to: if the current duplex mode is different from the next-step duplex mode, switch the duplex mode of the wireless communications apparatus to the next-step duplex mode; otherwise, keep the current duplex mode unchanged.

Further, the switching subunit 542 may be specifically configured to output a control signal to the wireless communications apparatus; and control the duplex mode of the wireless communications apparatus by using the control signal, to switch the duplex mode of the wireless communications apparatus to the next-step duplex mode. Specifically, a service transmitting processing unit, a baseband signal transmitting processing unit, a service receiving processing unit, a baseband signal receiving processing unit, a digital interference cancellation unit, and an analog interference cancellation unit in a communications unit are controlled by using the control signal. If the current duplex mode is different from the next-step duplex mode, the control signal is used for indicating that the duplex mode of the wireless communications apparatus is to be switched to the next-step duplex mode; otherwise, indicating that the current duplex mode is to be kept unchanged.

Further, the information about the transmitted signal and the information about the received signal of the wireless communications apparatus may include transmit power of a signal and receive power of a signal.

Further, the signal quality may include a signal-to-noise ratio of an input wanted signal, or the signal quality may include power and a signal-to-interference ratio of an input wanted signal.

Figure 6:
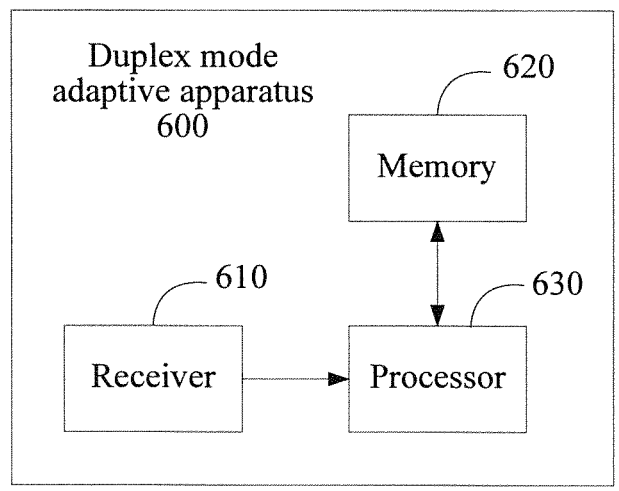
FIG. 6 is a structural block diagram of another duplex mode adaptive apparatus according to an embodiment of the present invention.

An embodiment of the present invention provides another duplex mode adaptive apparatus, where a structure of the duplex mode adaptive apparatus is shown in FIG. 6, and the duplex mode adaptive apparatus includes:

a receiver 610, configured to receive a modulation mode configuration table, self-interference isolation, and information about a transmitted signal and information about a received signal of a wireless communications apparatus;

a memory 620, configured to store information that includes a program routine; and a processor 630, coupled to the memory 620 and the receiver 610, and configured to control execution of the program routine, specifically including:

calculating signal quality of a current duplex mode according to the current duplex mode, the self-interference isolation, and the information about the transmitted signal and the information about the received signal; and predicting signal quality of a non-current duplex mode according to the non-current duplex mode, the self-interference isolation, and the information about the transmitted signal and the information about the received signal;

querying the modulation mode configuration table according to the signal quality of the current duplex mode and the signal quality of the non-current duplex mode, to obtain a maximum modulation mode of the current duplex mode and a maximum modulation mode of the non-current duplex mode;

calculating maximum spectral efficiency of the current duplex mode according to the maximum modulation mode of the current duplex mode, and calculating maximum spectral efficiency of the non-current duplex mode according to the maximum modulation mode of the non-current duplex mode;

comparing the maximum spectral efficiency of the current duplex mode with the maximum spectral efficiency of the non-current duplex mode, and selecting a duplex mode whose spectral efficiency is greater as a next-step duplex mode; and switching the current duplex mode of the wireless communications apparatus to the next-step duplex mode.

Further, the current duplex mode is a full duplex mode or a non-full duplex mode.

Further, the information about the transmitted signal and the information about the received signal of the wireless communications apparatus includes transmit power of a signal and receive power of a signal.

Further, the signal quality may include a signal-to-noise ratio of an input wanted signal, or the signal quality may include power and a signal-to-interference ratio of an input wanted signal.

For the duplex mode adaptive apparatus in the foregoing embodiment, content such as information exchange and execution processes among various units inside the duplex mode adaptive apparatus is based on a same concept with the method embodiments of the present invention. Therefore, reference may be made to the description in the method embodiments of the present invention for specific content, which is not repeated herein.

According to the duplex mode adaptive apparatus provided in this embodiment of the present invention, adaptive switching is implemented between a full duplex mode and a non-full duplex mode; when a channel condition is good, work takes place in a full duplex mode, thereby improving a capacity of a system; and when a channel condition is not good, work takes place in a non-full duplex mode, thereby ensuring reliable transmission of a service.

A person of ordinary skill in the art may understand that all or some of the steps of the foregoing method embodiments may be implemented by a computer program instructing relevant hardware. The program may be stored in a computer readable storage medium. When the program runs, the processes of the foregoing method embodiments are performed. The storage medium may include: a magnetic disk, an optical disc, a read-only memory (Read-Only Memory, ROM), or a random access memory (Random Access Memory, RAM).

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A duplex mode adaptive method, comprising:
   obtaining a modulation mode configuration table, self-interference isolation, and information about a transmitted signal and information about a received signal of a wireless communications apparatus;
   calculating signal quality of a current duplex mode according to the current duplex mode, the self-interference isolation, and the information about the transmitted signal and the information about the received signal;
   predicting signal quality of a non-current duplex mode according to the non-current duplex mode, the self-interference isolation, and the information about the transmitted signal and the information about the received signal;
   querying the modulation mode configuration table according to the signal quality of the current duplex mode and the signal quality of the non-current duplex mode, to obtain a maximum modulation mode of the current duplex mode and a maximum modulation mode of the non-current duplex mode;
   calculating maximum spectral efficiency of the current duplex mode according to the maximum modulation mode of the current duplex mode, and calculating maximum spectral efficiency of the non-current duplex mode according to the maximum modulation mode of the non-current duplex mode;
   comparing the maximum spectral efficiency of the current duplex mode with the maximum spectral efficiency of the non-current duplex mode, and selecting a duplex mode whose spectral efficiency is greater as a next-step duplex mode; and
   switching a duplex mode of the wireless communications apparatus to the next-step duplex mode.

2. The method according to claim 1, wherein the current duplex mode is a full duplex mode or a non-full duplex mode.

3. The method according to claim 1, wherein switching a duplex mode of the wireless communications apparatus to the next-step duplex mode comprises:
   if the current duplex mode is different from the next-step duplex mode, switching the duplex mode of the wireless communications apparatus to the next-step duplex mode; otherwise, keeping the current duplex mode unchanged.

4. The method according to claim 1, wherein the information about the transmitted signal and the information about the received signal comprises transmit power of a signal and receive power of a signal.

5. The method according to claim 1, wherein the signal quality comprises a signal-to-noise ratio of an input wanted signal.

6. The method according to claim 1, wherein the signal quality comprises power and a signal-to-interference ratio of an input wanted signal.

7. A duplex mode adaptive apparatus, comprising:
   an obtaining unit, configured to obtain a modulation mode configuration table, self-interference isolation, and information about a transmitted signal and information about a received signal of a wireless communications apparatus; and query the modulation mode configuration table according to signal quality of a current duplex mode and signal quality of a non-current duplex mode, to obtain a maximum modulation mode of the current duplex mode and a maximum modulation mode of the non-current duplex mode;
   a calculating unit, configured to:
   calculate the signal quality of the current duplex mode according to the current duplex mode, the self-interference isolation, and the information about the transmitted signal and the information about the received signal; predict the signal quality of the non-current duplex mode according to the non-current duplex mode, the self-interference isolation, and the information about the transmitted signal and the information about the received signal, and calculate maximum spectral efficiency of the current duplex mode according to the maximum modulation mode of the current duplex mode, and calculate maximum spectral efficiency of the non-current duplex mode according to the maximum modulation mode of the non-current duplex mode;

a selecting unit, configured to compare the maximum spectral efficiency of the current duplex mode with the maximum spectral efficiency of the non-current duplex mode, and select a duplex mode whose spectral efficiency is greater as a next-step duplex mode; and a switching unit, configured to switch a duplex mode of the wireless communications apparatus to the next-step duplex mode.

8. The apparatus according to claim 7, wherein the current duplex mode is a full duplex mode or a non-full duplex mode.

9. The apparatus according to claim 7, wherein the switching unit comprises:

a determining subunit, configured to determine whether the current duplex mode is the same as the next-step duplex mode; and a switching subunit, configured to: if the current duplex mode is different from the next-step duplex mode, switch the duplex mode of the wireless communications apparatus to the next-step duplex mode; otherwise, keep the current duplex mode unchanged.

10. The apparatus according to claim 7, wherein the information about the transmitted signal and the information about the received signal comprises transmit power of a signal and receive power of a signal.

11. The apparatus according to claim 7, wherein the signal quality comprises a signal-to-noise ratio of an input wanted signal.

12. The apparatus according to claim 7, wherein the signal quality comprises power and a signal-to-interference ratio of an input wanted signal.

* * * * *